United States Patent [19]

Kusayama et al.

[11]  4,297,160
[45]  Oct. 27, 1981

[54] LOCKING AND SEALING COMPOSITIONS AND METHODS FOR THEIR APPLICATION

[75] Inventors: Senji Kusayama, Toyonaka; Eijiro Nishi, Otsu, both of Japan; Hugh J. Stock, Saratoga, Calif.

[73] Assignees: Pacer Technology and Resources, Inc., Campbell, Calif.; Sumitomo Chemical Company, Ltd., Osaka, Japan

[21] Appl. No.: 57,666

[22] Filed: Jul. 16, 1979

[51] Int. Cl.³ ............................................... C09J 5/00
[52] U.S. Cl. ........................... 156/331.1; 73/150 A; 106/288 Q; 156/64; 156/92; 156/294; 156/344; 260/37 N; 260/42.21; 260/465.4; 428/43; 428/223; 428/463; 428/522; 526/298; 403/2
[58] Field of Search .................... 156/64, 247, 92, 294, 156/155, 344, 331, 91; 428/43, 463, 223, 522; 73/150 A; 403/2; 526/298; 260 465.4;37 N;42.21/; 106/288 Q

[56] References Cited

U.S. PATENT DOCUMENTS

| | | | |
|---|---|---|---|
| 2,768,109 | 10/1956 | Coover | 428/442 |
| 2,989,107 | 6/1961 | James et al. | 156/92 |
| 3,699,076 | 10/1972 | Thomsen et al. | 260/465.4 |
| 3,825,580 | 7/1974 | Kato et al. | 260/465.4 |
| 3,922,449 | 11/1975 | Bolger | 427/409 |
| 4,062,827 | 12/1977 | Zollman | 260/42.21 |
| 4,170,585 | 10/1979 | Motegi et al. | 428/463 |

Primary Examiner—John J. Gallagher
Attorney, Agent, or Firm—Cahill, Sutton & Thomas

[57] ABSTRACT

Thread locking compositions and analogous sealant materials having limited cured strength, and a preferred method for their compounding and application, are disclosed. These are based primarily on alpha cyanoacrylates, i.e. acrylate esters in monomer or low polymeric form, or of very low molecular weight, which are rapidly polymerizable to form solid and bonding films. The materials, in liquid form, are modified by inclusion of coloring agents and other film strength and reaction rate modifiers, to impart optimum properties of bonding strength, curing rate, moderate resistance in torque to separation of the bonded parts, low residual torque, along with good stability in storage, or good shelf life. Combinations of polymerization promoters and stabilizers are included, along with small quantities of specially selected coloring agents which not only impart effective color to thin films of the composition but serve to limit curing below high cured strength. The coloring agents are compatible with the monomers and the resulting cured polymers. Application of the protective composition to plated or unplated metal parts, plastic members which bear threads or seal surfaces, and the like, may be by standard coating procedures or by capillary action.

11 Claims, No Drawings

LOCKING AND SEALING COMPOSITIONS AND METHODS FOR THEIR APPLICATION

It is well known in the prior art that assembled metal and other mechanical parts often need protection against separation by causes such as vibration, expansion and contraction due to temperature changes and the like. For this reason, many ingenious mechanical seals and locking devices have been developed and used in large numbers. However, they have their limitations and in recent years the use of chemical coating, sealing and bonding agents has displaced the mechanical devices to a considerable extent. Nuts, and bolts, pipe and tube fittings threaded or otherwise fitted closely together, and analogous mechanical parts and fittings, whether of plated or unplated metal, or of synthetic resin or plastic composition, are often locked or sealed against mechanical separation, or are given protection against adverse fluids, such as water, water vapors, oils, corrosive gases and the like, by coating them, usually before assembly, with a liquid composition which will cure in situ and leave a protective bonding or sealing film or layer on or between the surfaces. Even finely machined parts often need such protection, either to prevent their inadvertent separation, or to seal them against intrusion of injurious substances, or both. Vibration and temperature variations, with resulting differential expansions of mated parts, are often the major causes of difficulties, but other factors such as variations in humidity, or the presence of corrosive fluids or dust, and the like can cause trouble.

As sealants or thread locking compositions (TLC) numerous substances have been proposed including thermo plastic resins, or solutions of natural or synthetic resins in evaporable solvents. The latter have a disadvantage, however, that time must be permitted to allow the solvent to evaporate and time too often is of the essence in production processes. Self-setting materials, those which polymerize and harden without use of a condensing or other curing process, such as use of heat, are favored. For thread locking purposes, and analogous sealing operations, the bonding material preferably is applied as a liquid, by standard methods, such as brushing or spraying, or, in some cases, by applying the liquid, in very free flowing form, so that it will creep into the space between the fitted parts, due to surface tensions, that is, by capillary action, especially in the case of threaded fittings.

For efficient production, the bonding, sealing or thread locking materials must be such as not to tie up assembly lines or other production facilities; hence they should react quickly, in the more common situations. Compositions which set up or polymerize rapidly are favored, although such setting up or polymerization must not occur so rapidly as to give poor protection. Hence, control of setting times, or of polymerization rates and the like, is of importance. Methods of application must be efficient and as simple as possible, hence multiple step applications are not favored. Materials which include solvents, which must be permitted to evaporate, are obviously less convenient that those which set up without waiting for removal of such ingredients from the protective composition. It has been suggested, for these reasons, that self-polymerizing compositions be used, and a preferred class of materials is the alpha cyanoacrylics esters and related compositions. The use of these has been suggested by Coover, U.S. Pat. No. 2,794,788, and in other references. These materials polymerize rapidly in situ; they need no solvent, and can be modified in various ways to control their viscosity, applied film thickness, capillary flow, and other characteristics. For this reason, they have come into wide usage.

The alpha cyanoacrylics, however, have certain shortcomings and a major purpose of the present invention is to overcome these. Various investigators in the prior art also have recognized their deficiencies and have made numerous proposals to overcome them. To prevent premature polymerization prior to use, as in storage, to prolong shelf life, certain stabilizers have been used, such as boron trifluoride, in small quantities, hydrogen fluoride, sulfur dioxide gas, and the like. The above-mentioned Coover patent suggests some of these and other references, such as U.S. Pat. No. 2,765,332, issued to Coover, have suggested a combination of sulfur dioxide and hydroquinol for this purpose. Some of the cyanoacrylates are anaerobic, that is, they are restrained from polymerization when they have access to oxygen but polymerize readily when oxygen is excluded. References such as U.S. Pat. No. 3,489,599, issued to Krieble, have suggested protecting such anaerobic materials from premature setting up by being certain that they are in contact with oxygen until they are to be used. When used, as they are applied to threaded parts which are assembled in such a way as to substantially exclude oxygen from the creeping film, polymerization takes place rapidly in situ.

For convenience of reference herein, the thin, free flowing or relatively non-viscous liquid, as originally applied, whether a true monomer or a dimer or other low polymer, in part or in full, will be referred to as a "monomer", although in many cases it is not technically a true monomer. Many other suggestions have been made for modifying alpha cyanoacrylic monomers and resins, including the addition of plasticizers, as in U.S. Pat. Nos. 2,784,127 and 2,784,215, issued to Joyner and Coover, respectively. The control of setting times (polymerization rate) has given difficulties in the past and references such as U.S. Pat. Nos. 3,259,534 and 3,282,773, issued to Wicher and Shearer, respectively, have made suggestions which include precoating one of the surfaces to be bonded with a reactive promoter, such as an epoxide, or to use ammonia and other reagents to neutralize the stabilizers such as sulfur dioxide, boron trifluoride, etc., that are usually employed, thereby to improve the rate of setting up by polymerizing in situ. Some of these have the disadvantage of requiring a separate or preliminary treating step, which of course slows down production where efficient production rates are important. Some of these, and others, also suggest the incorporation in the monomeric alpha cyanoacrylic compounds of plasticizers of various types, to prevent the bonding agent from becoming to hard or brittle, or "aging", and the like. Various materials have been suggested as plasticizers, including certain alkyl esters of monobasic or dibasic acids, such as acetates, sebacates, phthalates, and the like, or special polymeric plasticizers derived from some of the acrylics. Such references include some of those already mentioned, along with U.S. Pat. No. 3,354,128, issued to Wicker, and others.

The use of certain acrylics which are anaerobic in character, and hence will polymerize in the absence of anaerobics, has been mentioned above. References include U.S. Pat. No. 3,489,599, issued to Krieble and Nos. 3,547,851 and 3,625,875, issued to Frauenglass. Some of these suggest certain combinations of reactants to minimize prepolymerization, to control the flow of the applied sealant, and the like. Some of the modifiers thus suggested also include certain alpha cyanoacrylics. In the present invention, it is preferred to avoid the use of the strongly anaerobic acrylics, the simpler alpha alkyl cyanoacrylic esters being preferred.

In recent years the use of these alpha cyanoacrylic monomers for thread locking and related purposes has continued to increase. It is obviously desirable to be able to use a single composition, with a single application where adequate protection can be obtained by such simple procedures and an important object of the present invention is to devise a method by which this can be accomplished without loss of control over polymerization rates and without making the subsequent use of the protected parts or structures more difficult than necessary.

The bonding or locking together of threaded parts is in many ways analogous to the formation of adhesive bonds between other surfaces but there are some differences and some special problems which may be encountered when threaded parts are "locked" together by polymerizing materials. The bonding material, for thread locking, most of course increase the normal frictional resistant to offset forces in torque that would cause the parts to separate. However, this torque increase should not be so great as to make the intentional separation of the parts too difficult or such as would damage the parts that are locked together. A "break loose torque", the force required to separate assembled parts, must not be so great as to cause distortion or breakage, as by twisting off. Hard crystalline materials or solid matter of any kind must not build up in the threads to cause jamming or other damage. This can happen when filler materials, or the resin itself breaks up into frictional particles. The residual friction, i.e., the torque required to separate the parts after breaking them loose from each other, should be conveniently low but should not disappear altogether. Thus, "Break loose torque" (BLT) and running or "residual" torque (RT) are both of importance. An object of the present invention, therefore, is to form a bond which can be broken loose with reasonable effort, and without damage to the parts that are bonded together, and which offers low resistance to the further disassembly, that is, low residual torque.

The alpha cyanoacrylic polymers which result from application of the monomeric or low molecular weight esters are quite transparent and can be essentially invisible in many cases. It is obviously desirable to be able to detect readily and clearly where or whether the parts have been bonded. The prior art includes suggestions that dyestuffs or other suitable coloring agents be included, strong or sufficient enough to make thin films of the resin clearly visible. In fact, the use of these thread locking compounds is of sufficient interest to the U.S. Military forces that a military specification has been provided, MIL-S-22473D. It lists a number of desired products, graded by such factors as the locking torque (as measured by the resistance of a treated ⅜ inch diameter bolt and nut having twenty-four threads per inch, per MIL-S-22473D), the viscosity of the composition as applied, and the color coding. Various references have discussed the fact that these resins are often very difficult to color. They have a tendency to reject most coloring agents. Suggestions have been made for use of certain coloring agents which are said to be compatible with the alpha cyanoacrylic monomers, as well as with the cured polymers, such as U.S. Pat. No. 4,062,827, issued to Zollman, British Pat. No. 1,192,165 issued to Braun, and a recent publication by Taoka Chemical Company, Ltd., of Japan (Japanese Pat. No. 37260/1978). The latter describes some ways in which the alpha cyanoacrylates can be colored effectively. However, mere coloring per se, while perhaps of some importance, is not a major object of the present invention. It is an object to use a suitable coloring agent in such proportions and in such a way that it will not only impart a distinctive film color but will also help control setting properties, especially ultimate strength of "break loose" torque, and residual or running torque and keep them within desirable limits.

As noted above, some of the acrylates are strongly anaerobic, polymerizing rapidly in absence of oxygen, and these have attained some prominence for use as thread locking compositions and related sealants. They have some excellent properties but they also have some marked disadvantages, namely:

(1) They require a long curing time;
(2) They give poor performance when used with plastic base materials and with some plated metals;
(3) Their performance is variable, depending considerably on conditions of the surfaces to which they are applied; and
(4) they have low storage stability or shelf life.

Because of these disadvantages, the anaerobic compositions have not been used with great success on plastic threaded parts, nor on metal threaded parts which have been plated, as with zinc, nickel, cadmium or chromium. The platings apparently interfere with good curing.

For the reasons listed above, applicants prefer to use as starting materials, the relatively simpler alpha cryanoacrylates, essentially monomeric in character, of the general formula:

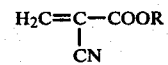

Wherein R is a radical having from 1 to 16 carbon atoms in total and selected from the group which consists of alkyl, alkenyl (with 2 to 6 carbon atoms), alkoxyalkyl (with 2 to 6 carbon atoms), a cyclohexyl group, and a phenyl group. The $C_1$ to $C_9$ alpha alkyl cyanoacrylate esters are generally preferred.

A bonding or sealing agent based on the monomer (or near monomer) just described, can set up in a limited period of time to bond many different types of base material effectively. Setting times may vary from as little as a very few seconds to a few minutes, depending on a considerable extent on the temperature of application and to some extent to the nature of the material and/or its surface to which the monomer is applied. By controlling viscosity, and thickness of the film as applied, setting or curing times can be controlled quite well, especially when the composition is further treated with the specifically preferred coloring agents as will be further described and discussed hereinbelow.

As mentioned above, some control may be made possible by the choice of additives such as sulfur dioxide and hydroquinol, as known in the prior art, by choice of thickeners, of which a number are available, as well as by temperature control sometimes to a considerable extent. A further control measure, important according to the present invention, is the incorporation of one or more carefully selected coloring agents which have the unexpected of not only giving a clear film color, which has often been very difficult to achieve, but also of controlling and limiting ultimate strength of bonding capacity and residual torque, as well, of the resulting bond layer.

The coloring agents found suitable for the purposes just described are one or more of the following dyestuffs, appropriately selected and/or combined, as will appear more fully below. These are chosen from modified basic dyestuffs having the following formulas:

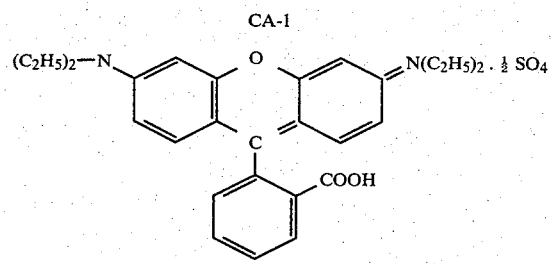

This is designated coloring agent CA-1. It is red in color.

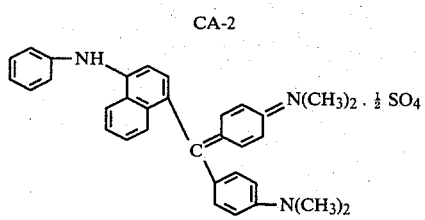

This coloring agent, CA-2, is blue in color.

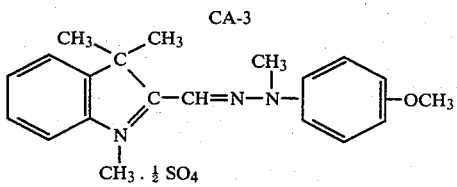

Coloring Agent CA-3 is yellow in color.

As will be pointed out more fully below, these are superior and mixtures thereof are usable; others are not suitable. By adding to the alpha cyanoacrylate small quantities of the coloring agent or agents, not only is a distinctive color imparted, even to a very thin film, but the film strength of the ultimately polymerized sealant is more perfectly controlling. This is accomplished, moreover, without detracting from its desirable rapid setting properties or even accelerating curing. In addition, the treating composition is as useful for application to plated metal parts, or to plastics, as it is to the more common untreated metals such as steel or iron nuts, bolts, pipe fittings, etc.

The ultimate torque value, or resistance to relative turning between coated parts threaded together, can become high enough in many cases to cause bolts to break or twist off. Hence, a torque decreasing agent is desirable or necessary for control of the break loose torque value (BLT). Plasticizers, such as dioctyl phthalate, dibutyl phthalate, dioctyl sebacate, dibutyl sebacate, tricresyl phosphate, and mixtures of these and other equivalent and well known plasticizers, may be used. Some of these have been suggested in the past for the same purpose. See U.S. Pat. No. 2,784,127, mentioned above. For controlling viscosity, appropriate thickeners may be used as required, as suggested in U.S. Pat. No. 2,794,788, also mentioned above. When the formulation requires addition of substantial quantities of modifiers, to control viscosity and to control the torque required for release, it has been found increasingly difficult to find an appropriate coloring agent. As suggested above, many coloring agents are insoluble in alpha cyanoacrylates, especially in the alpha alkyl cyanoacrylates, and most of those which do dissolve or are found to be compatible appear to cause the storage stability or shelf life to deteriorate. Particular properties sought, according to the present invention are:

(1) A one-component treating compound containing no solvents;
(2) Requiring no primers or secondary materials for rapid and permanent curing or setting;
(3) A much faster cure time compared with other chemical locking compounds;
(4) Simple and easy application, without requiring any substantial or difficult pretreatment of the base material which is to be sealed;
(5) Applicability to a wide range of base materials; and
(6) Having a long shelf life or storage capability.

The composition of the present invention has applications in areas where prior art materials have not been found suitable.

Some particular cyanoacrylates which are useful in the present invention include methyl alpha cyanoacrylate, ethyl-, iso-propyl-, n-butyl- and isbutyl, and the $C_1$ to $C_9$ alkyl alphacyanoacrylates, in general, as well as the simpler phenyl alpha cyanoacrylates and mixtures of any two or more of these. The dyes to be used, however, are limited, according to the present invention, to certain ones of those mentioned above, and to certain specific mixtures of them, as will be more fully pointed out in the detailed description of preferred embodiment which appears below herein. The amounts of coloring agents to be added generally are between the limits of 100 to 5000 ppm. The preferred range is narrower, between about 500 to 1600 ppm. In the present specification, the unit, ppm, means parts by weight per million parts by weight of an alpha cyanoacrylate. As noted above, the efficacy of the composition may be further improved by adding plasticizing and/or thickeners as bonding strength decreasing or modifying agents. If necessary, inert fillers and/or thixotropic additives may be included.

The composition of the present invention may be applied to threaded parts or analogous structures in a manner well known by those skilled in the art, for example, by coating or capillary action, whereby the threaded parts and analogous structure are effectively protected against separation and from adverse fluids and extraneous injurious substances, and the seal and bond are able to be detected visibly and moreover they are able to be broken loose with reasonable effort without damage of the threaded parts and analogous structures.

Method aspects of the present invention are of importance, both in the preparation or compounding of the compositions and in their uses and applications. These will be more fully set forth below in the detailed description of the preferred embodiment of the invention.

PREFERRED EMBODIMENT

EXAMPLE 1

(i) a basic adhesive or bonding agent consisting of methyl alpha cyanoacrylate, stabilized by addition of 15 ppm. of sulfur dioxide (by weight) and 200 ppm. of hydroquinone (hydroquinonol), was designated AD-1.

(ii) A higher viscosity material, obtained by adding 8.0 percent, by weight, of polymethylmethacrylate, a thick syrupy polymer, to the above described AD-1, was designated AD-2.

(iii) A basic adhesive or bonding agent monomer, ethyl alpha cyanoacrylate, modified as in AD-1, by addition of 15 ppm of sulfur dioxide and 200 ppm of hydroquinone, was designated AD-3.

(iv) A high viscosity material, obtained by adding 8 percent, by weight, of polymethylethacrylate, as an AD-2, to AD-3, was designated AD-4.

To each of the materials, AD-1, AD-2, AD-3 and AD-4, were added 800 ppm or a red, blue or yellow coloring agent, CA-1, CA-2, or CA-3, described above. Test procedures were as follows:

1. Color was tested by visual examination.
2. Viscosity was tested in centipoises, using a Brookfield Viscometer, at temperature of 20° C.
3. Setting or curing time, (ST), was determined according to ASTM D1002, the time for a steel to steel bond, with adhesive or bonding agent sample, to reach a tensil shear strength of 5 Kg./cm² at 20° C., where 55 to 60 percent R.H. is measured.
4. Bonding strength, room temperature cure (RTS), the tensile shear strength in Kg/cm², measured after 48 hours of curing at 20° C., and 55–60%RH.
5. Bonding strength, cured at high temperature (70°C.S). The tensil shear strength, measured after curing for 24 hours at 20° C. and 55–60%RH, and an additional 24 hours at 70° C., and 55–60%RH. Also measured in Kg/cm².
6. Bonding strength ratio; the change of bonding strength, as in 4 or 5, above, measured by taking the ratio of bonding strength of the sealant adhesive, without color added, to that with color added. Expressed in percentage (%).
7. Storage stability. The change in viscosity and in setting time, after 7 days of storage at 70° C., comparing the same uncolored basic material, AD-1, etc., against the colored one. In general, setting times decreased; the viscosity remained the same with two of the (unthickened) materials, increased somewhat with one and increased very considerably with the fourth one.

Results for the uncolored materials, vs. those colored red, are shown in Table 1A; those for blue coloring in Table 1B, those for yellow coloring in Table 1C,

EXAMPLE 2

Two additional coloring agents were tested by mixing 1000 ppm of each with the sealant or adhesive AD-3, described above. Coloring agent CA-4 was one of formula,

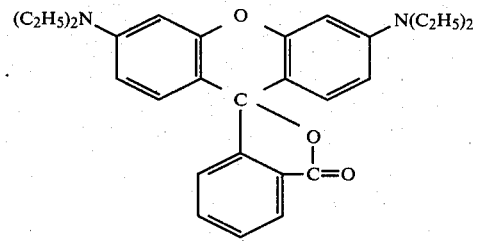

TABLE 1A

|      |         | Viscosity | ST    | RTS | 70° CS | Bonding Strength Ratio RTS | Bonding Strength Ratio 70° CS | Storage Stability Viscosity | Storage Stability ST |
|------|---------|-----------|-------|-----|--------|------|--------|-----------|--------|
| AD-1 | Blank   | 2.2       | 30"   | 233 | 179    | —    | —      | 2.5       | 30"    |
|      | Colored | 2.0       | 15"   | 223 | 148    | 95.7 | 82.8   | 2.5       | 15"    |
| AD-2 | Blank   | 34.0      | 2'00" | 231 | 164    | —    | —      | 45.0      | 1'45"  |
|      | Colored | 30.0      | 15"   | 201 | 139    | 87.2 | 84.8   | 70.0      | 30"    |
| AD-3 | Blank   | 2.2       | 1'30" | 180 | 184    | —    | —      | 2.5       | 30"    |
|      | Colored | 2.0       | 15"   | 136 | 112    | 75.6 | 61.0   | 2.5       | 15"    |
| AD-4 | Blank   | 52.4      | 2'15" | 187 | 153    | —    | —      | 130.0     | 2'30"  |
|      | Colored | 50.0      | 15"   | 134 | 115    | 71.7 | 75.2   | 440.0     | 30"    |

TABLE 1B

|      |         | Viscosity | ST    | RTS | 70° CS | Bonding Strength Ratio RTS | Bonding Strength Ratio 70° CS | Storage Stability Viscosity | Storage Stability ST |
|------|---------|-----------|-------|-----|--------|------|--------|-----------|--------|
| AD-1 | Blank   | 2.1       | 45"   | 244 | 160    | —    | —      | 2.5       | 45"    |
|      | Colored | 2.0       | 15"   | 221 | 122    | 90.6 | 76.2   | 3.0       | 15"    |
| AD-2 | Blank   | 55.0      | 2'30" | 185 | 173    | —    | —      | 100.0     | 2'15"  |
|      | Colored | 55.0      | 15"   | 128 | 113    | 69.2 | 65.4   | 90.0      | 15"    |
| AD-3 | Blank   | 2.2       | 1'30" | 188 | 164    | —    | —      | 2.5       | 45"    |
|      | Colored | 2.0       | 15"   | 147 | 116    | 78.3 | 70.8   | 2.5       | 15"    |
| AD-4 | Blank   | 57.5      | 2'30" | 209 | 181    | —    | —      | 110.0     | 2'00"  |
|      | Colored | 55.0      | 15"   | 204 | 130    | 97.5 | 71.8   | 80.0      | 15"    |

TABLE 1C

|  |  | Viscosity | ST | RTS | 70° CS | Bonding Strength Ratio RTS | Bonding Strength Ratio 70° CS | Storage Stability Viscosity | Storage Stability ST |
| --- | --- | --- | --- | --- | --- | --- | --- | --- | --- |
| AD-1 | Blank | 2.1 | 45" | 220 | 180 | — | — | 3.1 | 45" |
|  | Colored | 2.0 | 15" | 190 | 160 | 86.4 | 88.9 | 3.6 | 15" |
| AD-2 | Blank | 42.0 | 2'15" | 240 | 200 | — | — | 55.0 | 2'30" |
|  | Colored | 40.0 | 15" | 210 | 150 | 87.5 | 75.0 | 64.0 | 15" |
| AD-3 | Blank | 2.2 | 1'30" | 193 | 154 | — | — | 2.2 | 15" |
|  | Colored | 2.2 | 15" | 170 | 110 | 88.1 | 71.4 | 2.4 | 10" |
| AD-4 | Blank | 52.0 | 2'30" | 210 | 180 | — | — | 61.0 | 2'45" |
|  | Colored | 54.0 | 15" | 180 | 140 | 85.7 | 77.8 | 66.0 | 30" |

Coloring agent CA-5 had the formula,

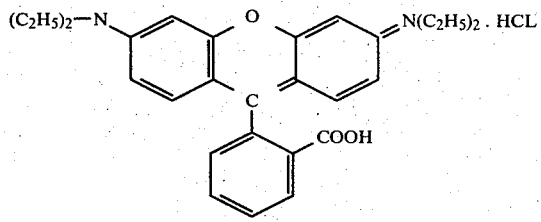

These agents CA-4 and CA-5 were tested in comparison with CA-1, for tinting strength and storage stability. Results are tabulated in Table 2;

TABLE 2

| Coloring Agent | Tinting Strength | Storage Stability* |
| --- | --- | --- |
| CA-4 | Colored somewhat but not sufficiently | Solidified in part. |
| CA-5 | Same as above | " |
| CA-1 | Colored well | Unchanged |

The materials in Table 2 were thoroughly dried by leaving them for at least 3 days at a temperature of 75° to 85° C., and then mixing them for more than three days at room temperature. Storage stability* was observed after 7 days storage at 70° C. Obviously, the coloring agents CA-4 and CA-5 were deficient for coloring purposes, whereas CA-1 (red) was an effective colorant, as also indicated above.

stabilizer. The results are given in Table 3, which indicates the various coloring agents and mixtures thereof: This table shows the room temperature strength, as in Tables 1A, 1B, and 1C gives the ratio of the change in bonding strength caused by addition of the coloring agent, and includes similar data for the high temperature curing and the ratio of change.

EXAMPLE 4

As indicated in Table 2, above, the coloring agents have an effect on the setting up characteristics of the polymers. Additional data were obtained by preparing colored monomers like AD-3, described above, adding 800 ppm respectively of the red coloring agent CA-1, blue agent, CA-2, yellow agent, CA-3, and a 50/50 mixture of the red and blue, which had a purple color. The yellow agent CA-3 also was tested adding 800 ppm, to a monomer sample. The test results showed that these coloring agents, had indeed a beneficial effect in controlling the bonding strength while still allowing short setting times.

TABLE 4

| Sample Composition | Time to reach 25 inch-lbs. torque (BLT) | Time to reach 50 inch lbs. torque | Time to reach 75 inch-lbs. |
| --- | --- | --- | --- |
| 1. Uninhibited AD-3 | 4 min. | 10 min. | 19 min. |
| 2. AD-3 plus red CA-1 | 8 min. | 28 min. | 85 min. |
| 3. AD-3 plus blue CA-2 | 7½ min. | 24 min. | 70 min. |
| 4. AD-3 plus purple(50/50) | 8 min. | 29 min. | 88 min. |
| 5. AD-3 plus yellow CA-3 | 7 min. | 23 min. | 75 min. |

TABLE 3

| Coloring Agent Color Tone | (Blank) Colorless | CA-1 Red | CA-3 Yellow | CA-2 Blue | CA-1/CA-3 = 20/80 Orange | CA-1/CA-2 = 50/50 Purple | CA-2/CA-3 = 40/60 Green | CA-1/CA-2/CA-3 = 15/5/80 Brown |
| --- | --- | --- | --- | --- | --- | --- | --- | --- |
| RTS | 169 | 70.0 | 58.0 | 117.0 | 60.2 | 99.0 | 61.0 | 62.7 |
| RTS (ratio of bonding strength change) | 100 | 41.4 | 62.3 | 69.2 | 51.1 | 58.5 | 55.4 | 60.0 |
| 70° CS | 134 | 65.0 | 27.0 | 76.0 | 32.0 | 88.0 | 29.0 | 30.0 |
| 70° CS (ratio of bonding strength change) | 100 | 48.5 | 50.0 | 56.7 | 51.1 | 65.6 | 48.3 | 49.2 |

EXAMPLE 3

Sealant compositions, based on AD-3, above, were uniformly colored with respect to each hue by adding 1600 ppm each of various colors prepared by mixing CA-1, CA-2 and/or CA-3, the red, blue and yellow coloring agents, or mixtures of two or more of these, in the butyl alpha cyanoacrylic ester otherwise the same as AD-3, described above. That is, the base adhesive was the $C_4H_9$ alkyl alpha cyanoacrylic ester, containing 15 ppm of sulfur dioxide and 200 ppm of hydroquinone as The unhibited sample in line 1 of Table 3 went on up to a strength well in excess of 100 inch pounds torque in about 32 minutes and probably levelled off well toward 200 inch pounds, which is substantially greater break loose torque (BLT) then the ⅝" test bolt could endure. Hence, failure would almost certainly occur if this material were used as a thread locking composition. The red, blue, yellow and the purple (50/50 red and blue) dyes all inhibited the ultimate strength to keep it will below 100 inch pounds torque; in fact the strength levelled off only a little above 75 inch-lbs.

Thus, an important aspect of the present invention is the discovery that the three coloring sheets, CA-1, CA-2 and CA-3 and mixtures of these, are good coloring agents and are also effective film strength or cure controllers. The preferred compositions of the invention are the base monomers or near monomers, as previously recited, combined with 500 to 1600 parts of each of these coloring agents and mixtures thereof. These compositions also preferably include the stabilizing sulfur dioxide and hydroquinone and may desirably include plasticizers and thickeners, as will be clear from the above data. Composition-wise, this is an important part of the invention.

The other aspect of the invention which is considered very important is the method of compounding and using the sealant or thread-locking materials. The steps, in combination, of adding carefully selected coloring agents, namely, the red, blue, and yellow dyes and combinations of these, to stabilized monomers, in a manner such as to expedite and not retard polymerization and setting up, constitute a new discovery. Whereas prior researchers have been able, in some cases, to merely color some of the cyanoacrylates, there is no evidence that many of them were enabled to control setting times or ultimate film strengths, both of which have been accomplished in the present invention.

The successful application to thread locking, and to analogous uses, of compositions which give reasonably good break loose torques, but limit them so as not to overstress the parts upon separation, and which have low running or residual torque after breakloose, is a novel and useful process. Running or residual torques, i.e., the resistance encountered against unscrewing or unthreading parts which have been broken loose after having been sealed together, are too low for recording with accuracy, with the equipment employed in testing for breakloose torque, but they were sufficient to keep the parts from running freely, probably of the order of about one to five inch pounds. The compositions, especially those which are plasticized, broke up something like a heavy grease—they did not show any tendency to build up between the threads to cause jamming. Since no fillers were used, there were very small quantities of materials remaining in the threads after separation of the previously treated parts. However, it is quite clear that some filler materials, especially those such as zinc oxide and other smooth, fine grained fillers, or material such as graphite, which are self-lubricating, may be used with the monomers of the present invention, if desired.

It will be obvious to those skilled in the art that numerous modifications, substitutions, and variations may be made in the composition, and to some extent in the method or process of compounding and applying, without departing from the spirit and purpose of the invention. It is intended by the claims which follow to cover these and other obvious equivalents and expedients, as fully as the present state of the art will properly permit.

What is claimed is:

1. A method of bonding threaded parts and analogous structures while sealing them from extraneous injurious substances which comprises adding to a rapidly polymerizable monomer of an alpha cyanoacrylate ester of general formula,

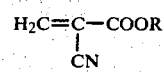

wherein R is a radical containing a total of 1 to 16 carbon atoms, said radical being selected from the group which consists of alkyl, alkenyl (with 2 to 6 carbon atoms), alkoxyalkyl (with 2 to 6 carbon atoms), cyclohexyl, and phenyl, a coloring agent in proportions of 100 to 5000 parts per million parts by weight of the monomer, selected from the group which consists of modified dyestuffs, red, blue or yellow in color, and mixtures thereof, having respectively the formulas,

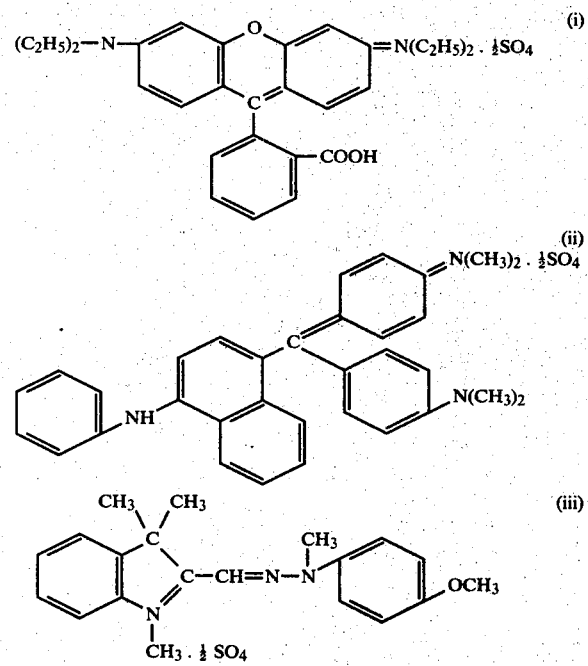

applying said monomer as a coating film to the surfaces to be joined and protected, contacting the coated surfaces, and polymerizing said monomer in situ to form a visibly colored bonding film on said surface while limiting the ultimate strength of said film by reason of strength modifying properties of said coloring agent, without retarding the rapid curing properties of the monomer.

2. A method according to claim 1 which includes the further step of adding to the monomer a further film structure modifying agent.

3. Method according to claim 2 in which the further modifying agent comprises a plasticizer.

4. A method according to claim 2 in which the further modifying agent comprises a thickener for the monomer.

5. A method according to claim 1 which comprises addition of 500 to 1600 parts per million of the coloring agent, incorporating small proportions of a stabilizer for said monomer where said stabilizer comprises sulfur dioxide, and adding a plasticizer to soften the ultimate bonding film.

6. A method of preparing a rapid setting composition suitable for use as a thread locking compound or sealant, which comprises adding to an alpha cyanoacrylate essentially monomeric in character, of the general formula,

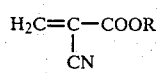

wherein R is a radical containing a total of 1 to 16 carbon atoms, selected from the group which consists of alkyl, alkenyl (with 2 to 6 carbon atoms), alkoxyalkyl (with 2 to 6 carbon atoms) cyclohexyl and phenyl, a coloring agent capable of not only imparting distinctive color to a thin film of said acrylate but also of limiting the ultimate strength of the film which results from said rapid setting, said coloring agent being selected from a red coloring agent having the formula,

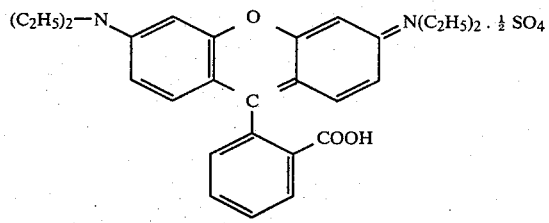

a blue coloring agent having the formula,

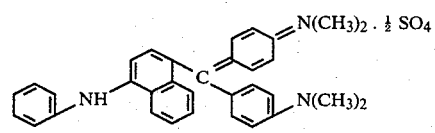

and a yellow coloring agent having the formula,

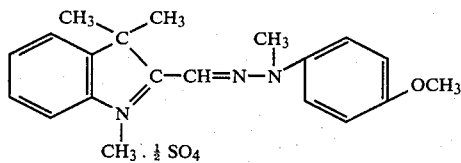

and mixtures thereof.

7. A composition of matter suitable for use as a sealing and locking material, for application in liquid form and subsequent solidification in situ on parts to be protected, which comprises, in combination, a major proportion of an alpha cyanoacrylate essentially monomeric in character, of the general formula,

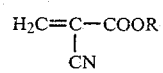

wherein R is a radical containing a total of 1 to 16 carbon atoms, selected from the group which consists of alkyl, alkenyl (with 2 to 6 carbon atoms), alkoxyalkyl (with 2 to 6 carbon atoms) cyclohexyl and phenyl, 100 to 5000 parts by weight per million parts by weight of the alpha cyanoacrylate, of a coloring agent selected from the group which consists of modified basic dyestuffs, red, blue or yellow in color, and having one of the formulas

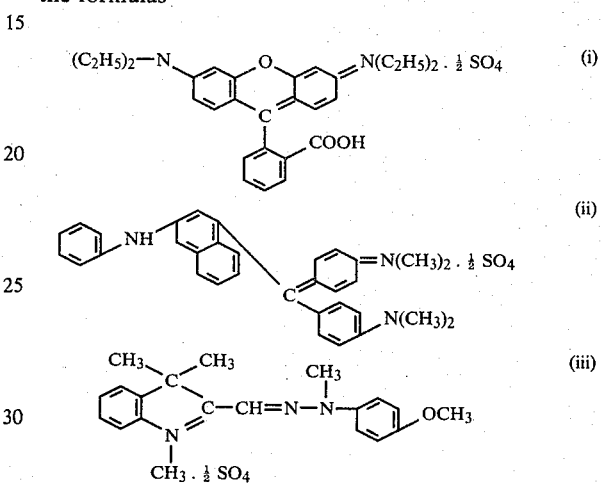

and mixtures thereof, formula (i) being a red formula (ii) a blue and formula (iii) being a yellow coloring agent, wherein the coloring agent also limits the locking strength of the composition to a level below its normal strength without coloring agent.

8. Composition according to claim 7 containing small proportions of sulfur dioxide and hydroquinone to stabilize the composition in storage.

9. Composition according to claim 7 which contains a plasticizer to control ultimate break loose torque.

10. Composition according to claim 7 which contains 500 to 1600 parts by weight per million parts by weight of the alpha cyanoacrylate of the coloring agent and contains also a plasticizer, said composition having an ultimate shear strength of not to exceed 100 inch-pounds in torque.

11. Composition according to claim 7 which contains also a thickener to increase viscosity.

* * * * *